3,583,938
FLAME RETARDANT FIBER AND PROCESS FOR MANUFACTURING THE SAME

Hisao Okada, Saburo Hiraoka, and Koji Mimura, Otake-shi, Yoshikatsu Ogawa, Takatsuki-shi, Akihumi Nagai, Osaka, and Haruhiko Hisada, Yao-shi, Japan, assignors to Mitsubishi Rayon Company Limited, Tokyo, and Marubishi Yuka Kogyo Kabushiki Kaisha, Osaka, Japan
No Drawing. Filed Dec. 23, 1968, Ser. No. 786,473
Int. Cl. C08b 27/66; C08f 45/58; C08g 51/60
U.S. Cl. 260—45.9R                                 5 Claims

ABSTRACT OF THE DISCLOSURE

A flame retardant natural or synthetic fiber containing a compound of the formula

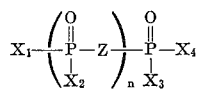

wherein $X_1$, $X_2$, $X_3$ and $X_4$ represent OH, $ONH_4$, $OCONH_2$, $OCONHCH_2OH$ or $OR_1$; $R_1$ represents hydrocarbon residue having from 1 to 18 carbon atoms or said hydrocarbon residue substituted with a halogen or hydroxyl radical; at least one member among $X_1$, $X_2$, $X_3$ and $X_4$ is —$OR_1$ and at least one member among them is $OCONH_2$ or $OCONHCH_2OH$; Z represents O, $OR_2$ or $OR_2O$; $R_2$ represents alkylene; and $n$ is an integer from 0 to 20.

---

A flame retardant fiber is manufactured by treating a fiber with the above-mentioned compound or by adding the compound into a spinning solution of a synthetic polymer.

This invention relates to a natural or synthetic fiber having superior flame retardant properties and a process for manufacturing same.

Heretofore, various proposals have been made to produce flame retardant fibers. In one method to produce the fibers, a monomer containing chlorine or phosphorus is introduced into a chain of a fiber-forming polymer. Fibers obtained by this process are used for specific purposes but this process is unsatisfactory from the point of dyeability of the fiber, textile processability and hand feel of fiber. In other methods to produce the fibers, a fiber-forming polymer or fiber is treated with a compound containing phosphorous and/or antimony. However, this method has disadvantages in that the flame retarding property of the fibers is temporary, the fibers tend to color and hand feel of the fiber is lowered. Consequently, there is no evidence of such a process being carried out on a commercial scale.

This invention relates to a flame retardant fiber containing a compound, as flame retarding agent, having the general formula

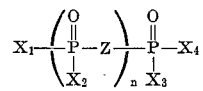

wherein $X_1$, $X_2$, $X_3$ and $X_4$ represent a radical selected from the group consisting of OH, $ONH_4$, $OCONH_2$ and $OCONHCH_2OH$ ($OCONHCH_2OH$ radicals may be directly joined to one another to form an intramolecular or intermolecular condensate) and $OR_1$; $R_1$ represents a radical selected from the group consisting of hydrocarbon residue having from 1 to 18 carbon atoms and said hydrocarbon residue having a substituent selected from the group consisting of halogen and hydroxyl radicals; at least one member among $X_1$, $X_2$, $X_3$ and $X_4$ is $OR_1$ and at least one member among $X_1$, $X_2$, $X_3$ and $X_4$ is a radical selected from the group consisting of $OCONH_2$ and $OCONHCH_2OH$; Z represents a radical selected from the group consisting of O, $OR_2$, and $OR_2O$; $R_2$ represents an alkylene radical; and $n$ is an integer from 0 to 20.

The typical compounds (flame retarding agents) used in this invention for making fibers flame retardant are indicated below.

(a) Condensation product of dimethylphosphate and urea having the structural formula

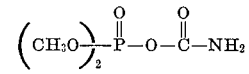

(b) Condensation product of diallylphosphate and urea having the structural formula

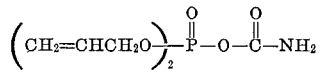

(c) Condensation product obtained by reacting a condensation product of polyphosphoric acid or phosphorus pentoxide and uera with epichlorohydrin and having the structural formula

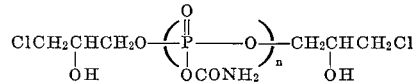

(d) Product obtained by neutralizing a condensation product of 2,3-dibromopropylphosphate and urea with ammonia and having the structural formula

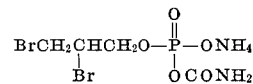

Flame retarding agents used in this invention are generally obtained by a method of adding urea to a condensation product of phosphorus pentoxide and alcohol and heating the resulting product to a high temperature and then, if necessary, treating the product with ammonia to stabilize the product. A flame retarding agent is not necessarily a pure compound and there are many cases in which more than 1 kind of compound indicated by the aforementioned general formula are contained. In one method of this invention, the flame retarding agent is used without removing by-products produced during the manufacture of said flame retarding agent. Also, said flame retarding agent may be used together with other additives or resin finishing agents.

Flame retarding agents in which $n$ of the compound indicated by the general formula is greater than 1 are stable and have superior ability to impart nonflammability to the fibers. Furthermore, those flame retarding agents can be used and stored for long periods of time and still remain stable, even if those agents are used together in the same bath with other additives because these agents have a weak ionization property in an aqueous solution. It is preferable to have $n$ in a range of 1 to 12.

In this invention, the $OCONH_2$ radical or $$OCONHCH_2OH$$

radical in the formula not only has the effect of increasing the flame retarding property of the compound but also has the effect of improving the stability of the compound itself, and since such a radical contains the

ester bond, a compound having such a radical is more stable than a compound having no such radical.

Also, tris-(2,3-dibromopropyl)-phosphate (TBPP) which is well-known as a flame retarding agent discolors fibers when it is maintained for a long time at a high temperature and in extreme cases, it becomes black. However, the flame retarding agent of this invention is stable under similar conditions.

Furthermore, as compounds similar to the compound of this invention, condensation products of phosphoric acid and urea are known. But these compounds cannot be said to be desirable as flame retarding agents. Condensation products having RO—P bond are more stable, for example, to hydrolysis, than compounds having R—P bonds. Particularly, when an electron attracting radical such as halogen or a hydroxyl radical is present on the carbon in the $\alpha$ position of the R—P bond, the compound becomes unstable to hydrolysis as the electron density of the phosphorus atom is lowered.

Also, it is necessary to carry out the reaction in a nitrogen stream or in a sealed container in order to obtain condensation products having the R—P bond or H—P bond but the reaction to obtain flame retarding agents in this invention can be carried easily in air.

Fibers, to which this invention can be applied, include natural fibers such as cotton and wool, and man-made fibers such as acrylonitrile polymer fiber, cellulose acetate fiber, viscose fiber, polyamide fiber and polyester fiber.

Natural fibers may be treated with resins or other agents.

Acrylonitrile polymer fibers include fibers of acrylonitrile homopolymer or copolymer containing more than 40% of acrylonitrile. Blended polymer fibers may be used.

As cellulose acetate fiber, cellulose diacetate fiber is preferably used but cellulose triacetate is also used.

As polyamide fiber, besides so-called nylon 66, nylon 6, 10 and 11 may be used. Polyamide fiber containing a so-called third component may also be used.

As polyester fiber, besides polyethylene terephthalate fiber, fiber containing a so-called component is used.

The method used for obtaining the flame retardant fiber of this invention is selected in accordance with the kind of fiber material selected.

One method includes treating the natural fiber or synthetic polymer fiber with a solution or dispersion containing the flame retarding agent. This process includes a method of immersing the fibers in the solution containing the flame retarding agent, squeezing the solution appropriately from the fiber and then drying or heat treating the fibers and a process of spraying the fibers with said solution and then drying the fibers. This method is applied to all fibers irrespective of the kind of the fiber.

When the fibers are obtained by wet spinning or dry spinning, the flame retarding agent may be added to a spinning solution of the polymer, the resulting spinning solution is extruded through a spinneret into a coagulating solution or air to form filaments and the filaments thus formed are subjected to after treatment. Also, filaments obtained by a conventional spinning process may be treated in a swollen condition. In this case, the object of this invention can be attained easily by adding the flame retarding agent to a finishing bath.

As explained above, the flame retarding agent is contained in the fiber in various forms but the word "contained" in this invention also refers to the case where the flame retarding agent adheres to the surface of the fiber.

The minimum weight content of the flame retarding agent on the basis of the fiber differs in accordance with the kind of final product to be obtained and the method of production of the flame retardant fiber. For example, with carpets in which a relatively low nonflammability is required, the content of the flame retarding agent may be relatively low. However, with curtains and clothing, in which a relatively high nonflammability is required, a relatively high content of the flame retarding agent is necessary.

This invention will be explained in further detail below with reference to an acrylonitrile polymer fiber.

Acrylonitrile polymers include acrylonitrile homopolymers and copolymers containing more than 40% of acrylonitrile together with ethylenically unsaturated compounds such as vinyl acetate, acrylic acid, methyl acrylate, methyl methacrylate, vinyl chloride, vinylidene chloride, vinyl bromide and methacrylonitrile.

Solvents for manufacturing fibers from these polymers include those conventionally used in the manufacture of acrylonitrile polymer fibers, for example, organic solvents such as dimethylformamide, dimethylacetamide, dimethylsulfoxide, $\gamma$-butyrolactone, acetonitrile, methylene chloride and acetone, and aqueous inorganic salt solutions such as sodium rhodanate and zinc chloride, and an aqueous inorganic acid solution such as nitric acid.

The aforementioned flame retarding agent is dissolved uniformly in the solvent and the polymer is added to the solution to obtain a homogeneous spinning solution. The resulting solution is extruded through a spinneret by a conventional method to form filaments and the filaments thus formed are subjected to aftertreatment such as washing, drying and heat treatment for producing the flame retardant acrylonitrile polymer fiber.

In another method, such as producing acrylonitrile polymer fibers by the wet spinning process, the spun swollen fibers are immersed in a bath of solution containing the flame retarding agent or are sprayed with a solution containing the flame retarding agent, and then heat treated.

The flame retardant fibers obtained by the above methods are not only superior in nonflammability but also in durability after laundering and other properties because the flame retardant is contained within the polymer of the fiber.

In still another method, the dried fibers or fibers made into final products are immersed in a bath solution containing the flame retarding agent or are sprayed with a solution containing the flame retarding agent, and the flame retarding agent adheres to the surface of the fibers. In this case, durability is unsatisfactory as most of the flame retarding agent is present on the surface of the fibers and consequently it is desirable to use resin agents together therewith.

The quantity of flame retarding agent contained in the fiber when carrying out the above methods is below 40% based on the weight of the fiber. When the quantity of flame retarding agent is larger than 40%, the properties of the fibers are remarkably reduced and the hand feel of the final product is also remarkably reduced. Furthermore, various difficulties are encountered during the fiber manufacturing process.

Tests for comparing the non-inflammability of fibers or products are carried out according to the following methods.

(1) Methods for testing non-inflammability of carpets (a) Paper match method (horizontal method).—A paper match with a head of 6 mm. and stick length of 32 mm. and width of 3 mm. is placed horizontally on a carpet which has been placed in an iron container provided with a ventilation opening and the match is lighted. The carpet starts to burn when the match has burned for about 70 seconds.

The evaluation of the flame retarding property of the carpet is indicated as to whether it is self-extinguishing, continues to burn, or by the carbonized length when it is self-extingiushing.

(b) Meckel burner method (45° angle method).—A piece of carpet is cut into a 30 cm. x 20 cm. piece, and the longer side is slanted at an angle of 45° with the pile side facing downward. The flame of a Meckel burner with a flame length of 6.5 cm. is contacted with the carpet at a point 5 cm. from the lower end. The flame which touches the carpet is 1.5 cm. and the contact time is 30 seconds.

The evaluation of the nonflammability of the carpet is made on the basis of whether the carpet is self-extinguishing after removing the flame from the carpet, time of after-flame, time of after-smoke and length of carbonization, classified into 1st class, 2nd class and 3rd class as indicated below and of these, 1st and 2nd classes are considered as qualified.

| Class | Carbonized length (cm.) | Time of— After-flame (sec.) | Time of— After-smoke (sec.) |
| --- | --- | --- | --- |
| 1 | <5 | 0 | 5 |
| 2 | 5-10 | 0 | 10 |
| Below 3 | >10 | (¹) | >10 |

¹ Not zero.

(2) Method for testing non-inflammability of curtains

The sample is cut into a 32 x 23 cm. piece, flame contact time is 2 minutes and the other procedures are the same as the carpet burning test method of (1)(b) in which it is slanted at 45°.

(3) Method for testing flammability of bedding quilt 10 g. of sufficiently opened 12 x 12 cm. card web is wrapped in 2 pieces of 15 x 15 cm. acetate cloth and the edges are sewn to form a small bed quilt. 1 cc. of 95% ethyl alcohol is dropped on one point of said quilt through a pipette. This is lighted with a match 5 seconds thereafter. The evaluation of the flame retarding property is made by the presence or absence of a self-extinguishing property.

EXAMPLE 1

(A) 142 g. of phosphorus pentoxide was added to 220 g. of n-butyl alcohol with stirring and reacted at a temperature from 40 to 50° C. 100 g. of urea was added to the resulting product and heated at a temperature from 140 to 160° C. to obtain a condensation product which was believed to be a mixture of the following compounds.

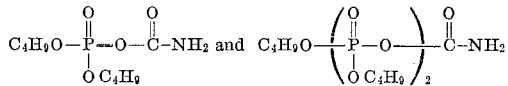

(B) A polymer containing 93% acrylonitrile and 7% methylacrylate and having a specific viscosity of 0.15 was dissolved in dimethylformamide to obtain a spinning solution containing 25% of the polymer. This spinning solution was extruded through a spinneret into an aqueous coagulating bath containing 50% dimethylformamide and kept at 40° C. The filaments thus formed were stretched to 5 times in boiling water, the stretched filaments in a swollen condition were immersed in an aqueous solution containing 0.7% of oiling agent Sufanol AW60 (made by Sanyo Chemical Co.) and 4% of the aforementioned flame retarding agent, and liquid was squeezed from the filaments by passing the filaments through squeezing rolls, by which the liquid content in the filaments became 100%. Next, the filaments were dried continuously on rollers heated to 140° C. and treated for 30 minutes in saturated steam of 120° C. The flame retarding agent was fixed on the filaments. The filaments were cut to staple fibers and the fibers obtained were scoured for 15 minutes at 70° C. in an aqueous solution containing 0.2 g./l. of nonionic surfactant Scourol #400 (made by Kao Soap Co.) and 0.1 g./l. of sodium solution containing 0.2 g./l. of nonionic surfactant Scourol #400 (made by Kao Soap Co.) and 0.1 g.l. of sodium pyrophosphate, washed with water and then dyed for 1 hour in an aqueous solution of 0.4 g./l. basic dye Sevlon Blue 2G (made by Du Pont Co.) 0.1 g./l. acetic acid and 0.1 g./l. sodium acetate at 98° C. with a bath ratio of 1:50.

The dyed fibers were made into a tufted carpet of 1200 g./m.² weight and 7 mm. pile height according to a conventional method.

The flame retarding property of the carpet was determined by the Paper Match Method. Inflammation of the carpet obtained by this example was not observed. The test was repeated, except that the filaments were not passed through the solution containing the flame retarding agent. In this case, the carpet caught fire after 30 seconds, flame was observed even after the match had burnt out and thus the carpet had burnt completely.

EXAMPLE 2

By the same method as in Example 1 except for using an aqueous solution containing 9% flame retardant, a carpet with a weight of 1200 g./m.² and pile height of 7 mm. was obtained.

Inflammation of the carpet obtained was observed by the Meckel Burner Method, the carbonized length was 9 cm., after-flame time was 0 sec. and after-smoke time was 0 sec., and the carpet qualified as 2nd class.

EXAMPLE 3

(A) 142 g. of phosphorus pentoxide was added to 138 g. of ethyl alcohol with stirring and reacted at a temperature from 40 to 50° C. 100 g. of urea was added to the resulting product and heated at a temperature from 140 to 160° C., by which 292 g. of compound was obtained. It was believed that the compound is a mixture of the following compounds.

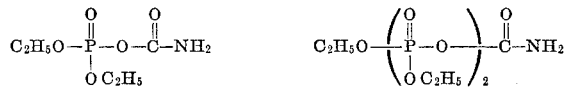

(B) A methanol solution containing 5% of the flame retarding agents obtained by the above method was sprayed on the pile surface of a carpet composed of pile yarn made from 100% acrylonitrile polymer fiber "Vonnel" (made by Mitsubishi Rayon Co.), with a weight of 1200 g./m.² and pile height of 7 mm. The adhering quantity of said flame retarding agent was 15 g./m.². Then the carpet was dried for 30 minutes at 80° C.

The carpet obtained was not inflammed when tested by the Paper Match Method and by the Meckel Burner Method, the carbonized length was 6.5 cm., after-flame time was 0 sec., after-smoke time was 0 sec., and the carpet qualified as a 2nd class product.

EXAMPLE 4

Six different methanol solutions each containing one of the flame retarding agents indicated by the following formulas were sprayed on a tufted carpet composed of 100% acrylonitrile polymer fiber "Vonnel" (made by Mitsubishi Rayon Co.) having a pile yarn weight of 1200 g./m.² and pile height of 7 mm. The adhering quantity of the flame retarding agent was 15 g./m.². The treated carpet was then dried for 30 minutes at 80° C.

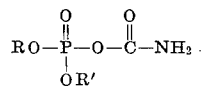

(1) R and R' are $CH_3$
(2) R and R' are $C_2H_5$
(3) R and R' are $C_4H_9$
(4) R is $C_3H_6Br$, R' is $C_2H_5$
(5) R and R' are $C_{12}H_{25}$
(6) R is $CH_3$, R' is $CH_2=CHCH_2$ The results of the non-inflammability test of the 6 carpets obtained and a untreated carpet are shown in the following table.

| | Meckel Burner Method | | | | |
|---|---|---|---|---|---|
| | Carbonized length (cm.) | Time of— | | Qualification (class) | Paper match method |
| | | After-flame (sec.) | After-smoke (sec.) | | |
| Untreated | >15 | (¹) | (¹) | <3 | Completely burnt |
| (1) | 5.9 | 0 | 0 | 2 | No inflammation. |
| (2) | 6.1 | 0 | 0 | 2 | Do. |
| (3) | 7.5 | 0 | 0 | 2 | Do. |
| (4) | 7.0 | 0 | 0 | 2 | Do. |
| (5) | 9.2 | 0 | 0 | 2 | Do. |
| (6) | 7.1 | 0 | 0 | 2 | Do. |

¹ Completely burnt.

The aforementioned flame retardants were prepared in a similar manner as in Example 3 from phosphorus pentoxide in the corresponding alcohols. For example the flame retardant (1) used in this example was obtained by the following method.

142 g. of phosphoric anhydride was added in small increments to 150 g. of methanol while cooling. After addition was complete, the mixture was reacted for 1 hour at a temperature of 50° C. The unreacted methanol was removed from the reaction product at a temperature of 70° C. under a reduced pressure of 10 mm. Hg for 1 hour. The weight of the resulting product (methyl acid phosphate) was about 236 g.

120 g. of urea and 20 g. of water were added to this product and the resulting mixture was gradually heated with stirring, and maintained for 15 minutes at a temperature 150° C. to obtain a transparent, high viscosity product indicated by the following formula.

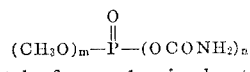

(wherein the total of $m$ and $n$ is about 3).

EXAMPLE 5

(A) 200 g. of 37% formalin was added to 300 g. of

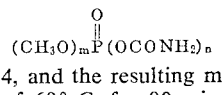

used in Example 4, and the resulting mixture was heated at a temperature of 60° C. for 90 minutes at a pH of 8 to obtain the following compound.

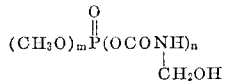

(wherein the total of $m$ and $n$ is about 3).

(B) A flame retardant carpet was prepared in exactly the same manner as in Example 4 except for using the above flame retardant. Tests of the carpet showed that inflammation was not observed by the Paper Match Method and by the Meckel Burner Method, the carbonized length was 6.8 cm, after-flame time and after-smoke time were both 0 sec. and the carpet was qualified as a 2nd class product.

EXAMPLE 6

A flame retarding agent mainly containing the following compound

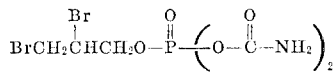

was dissolved in dimethylformamide to obtain a homogeneous solution of 1.3 wt. percent of the agent.

Separately, a copolymer of 93% acrylonitrile and 7% acrylic acid and having a specific viscosity of 0.155 in a 0.1 g./100 ml. dimethylformamide solution at a temperature 25° C. was obtained by using a redox catalyst of potassium persulfate-sodium bisulfate.

270 parts of this copolymer was added to the dimethylformamide solution containing the aforementioned flame retarding agent and this solution was heated for 1 hour at a temperature of 90° C. to obtain the spinning solution.

This spinning solution was extruded through a spinneret having 30 holes of 0.18 mm. diameter at a temperature 105° C. into a spinning column with a column diameter of 20 cm. and column length of 6 m. and containing a nitrogen stream. The temperature at the top of the column was 230° C. and at the bottom was 180° C. The filaments thus formed were taken up at a speed of 200 m./min. The unstretched filaments which still contained solvent were washed, stretched to 5 times under tension in water of 98° C., immersed in a bath containing an antistatic agent and dried. The filaments were cut to staple fibers and the fiber obtained contained 2.5% o.w.f. of flame retarding agent.

A loop pile carpet with a weight of 1300 g./m.² and pile height of 10 mm. made from the fiber was subjected to burning tests. By the Meckel Burner Method, the carpet was inflammed 13 seconds after contacting the flame but the carpet was self-extinguished in 0.5 sec. after the flame was removed, the carbonized length was 9 cm., and after-flame time and after-smoke time were 0 sec.

When the same test was repeated with the carpet made from fibers which did not contain the flame retarding agent, the carpet continued to burn even after the flame was removed and thus the carpet was burnt completely.

The flame retarding agent used in this example was prepared by the following method.

142 g. of phosphoric anhydride was added slowly to 654 g. of 2,3-dibromopropanol with stirring at a temperature 50 to 80° C. and maintained for 1 hour at a temperature 80° C. Next, 180 g. of urea was added to 796 g. of the condensation product and heated for 30 minutes at a temperature from 130 to 150° C. The condensation product was a mixture which mainly contained the aforementioned compound.

EXAMPLE 7

9.5 parts of a copolymer containing 94% acrylonitrile and 6% vinyl acetate and having a specific viscosity of 0.150 was mixed with 0.4 part of a flame retarding agent having the formula indicated below and 90.5 parts of an aqueous solution of 47% sodium thiocyanate to obtain the spinning solution.

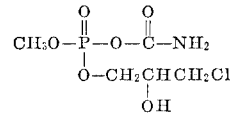

This spinning solution was extruded through a spinneret having 200 holes of 0.08 mm. diameter into an aqueous coagulating bath containing 12% sodium thiocyanate to form coagulated filaments. The filaments thus formed were washed with water, stretched to 7 times in water of 98° C., passed through a bath containing an antistatic agent, dried continuously and then shrunk 20% in pressurized steam. The filaments were cut into staple fibers and the fibers obtained contained 2.8% o.w.f. of flame retarding agent.

A carpet was made in the same method as in Example 6 and subjected to a burning test according to the Meckel Burner Method. The results were a carbonized length of 8.1 cm., after-flame time of 0 sec., after-smoke time of 0 sec. and the carpet qualified as 2nd class.

EXAMPLE 8

25 parts of terpolymer containing 85% acrylonitrile, 5% methyl acrylate and 10% vinyl bromide and having specific viscosity of 0.15 was added to 750 parts of dimethylacetamide containing 12.5 parts of flame retarding agent whose chief component was $$(H_2N-\overset{O}{\underset{\|}{C}}-O)_2-\overset{O}{\underset{\|}{P}}-O-\underset{\underset{\underset{OH}{|}}{OCH_2CHCH_2Cl}}{\overset{O}{\underset{\|}{P}}}-O-\overset{O}{\underset{\|}{C}}-NH_2$$

to obtain a spinning solution. This spinning solution was extruded through a spinneret having 1000 holes of 0.125 mm. diameter at a temperature 80° C. into an aqueous coagulating bath containing 55% dimethylacetamide at 40° C. to form coagulated filaments. The filaments thus formed were washed with water, stretched to 5.5 times in boiling water, dried and shrunk 25% by heat treatment in saturated steam and cut to staple fibers.

A casement curtain made from these fibers with a weight of 150 g./m.$^2$ was subjected to a burning test by the aforementioned method for testing non-inflammability of curtains. The results were a carbonized length of 5.1 cm. after-flame time of 0 sec., after-smoke time of 0 sec. and the curtain qualified as 2nd class.

On the other hand, a curtain made in a similar method with the exception that flame retarding agent was not added continued to burn even after the flame was removed and thus the curtain was burnt completely.

The flame retarding agent used in this example was produced by the following method.

2.48 kg. of 89% phosphoric acid, 0.8 kg. of urea and 1.24 kg. of water were mixed and heated at a temperature of 140° C. with stirring. 264 g. of the compound obtained was heated at temperature a of 120° C., 185 g. of epichlorohydrin was added slowly with stirring, then the temperature was raised slowly to 140° C. and maintained for 2 hours.

EXAMPLE 9

A methanol solution containing 5% of one of the flame retarding agents indicated below was sprayed on a carpet made from pile yarn which was mix-spun from acrylonitrile polymer fiber "Vonnel" (made by Mitsubishi Rayon Co.) and 20% wool, and having a weight of 130 g./m.$^2$ and pile height of 7 mm. The adhering quantity of the flame retarding agent was 13 g./m.$^2$. Next, this carpet was heat treated for 30 minutes at 80° C.

(1)
$$\left(C_4H_9O\right)_2-\overset{O}{\underset{\|}{P}}-O-\overset{O}{\underset{\|}{C}}-NH_2$$

(2)
$$\left(C_8H_{17}O\right)_2-\overset{O}{\underset{\|}{P}}-O-\overset{O}{\underset{\|}{C}}-NH_2$$

By the Meckel Burner Method, the carbonized length was 8.1 cm., after-flame time and after-smoke time were both 0 sec. and the carpet qualified as 2nd class when treated with (1), while the carbonized length was 9.5 cm., after-flame time and after-smoke time were both 0 sec. and qualified as 2nd class when treated with (2). By the Paper Match Method, carpets treated with (1) and (2) were not ignited.

EXAMPLE 10

Tufted carpet made from pile yarn of 50% acrylonitrile polymer fiber (made by Mitsubishi Rayon Co.) and 50% rayon, and having a weight of 1000 g./m.$^2$ and pile height of 6 mm. was treated by the same method as in Example 3 except that a flame retarding agent whose chief component was a compound indicated below was used. The adhering quantity of the flame retarding agent was 10 g./m.$^2$.

$$CH_3O-\left(\overset{O}{\underset{\underset{OCONH_2}{|}}{\overset{\|}{P}}}-O\right)_n-CH_3$$

(wherein $n=8$)

The flame retarding agents contain compounds with $n$ smaller than 8 and those with $n$ larger than 8.

When the burning test was carried out by the Meckel Burner Method, the carbonized length was 6.5 cm., after-flame time and after-smoke time was 0 sec. and the carpet qualified as 2nd class.

EXAMPLE 11

A casement curtain having a weight of 220 g./m.$^2$ was made from acrylonitrile polymer fibers containing 82% acrylonitrile, 5% vinyl acetate and 13% vinyl bromide by a conventional method. This curtain was immersed in an aqueous emulsion containing 5% of a flame retardant indicated by the following formula, $$ClCH_2CHCH_2O-\underset{\underset{OH}{|}}{\overset{O}{\underset{\|}{P}}}-OCH_2CH_2O-\underset{\underset{OC_2H_5}{|}}{\overset{O}{\underset{\|}{P}}}-O-\underset{\underset{OC_2H_5}{|}}{\overset{O}{\underset{\|}{C}}}-NH_2$$

passed through squeezing rollers so that 5% of the flame retarding agent adhered to the curtain and then heated for 5 minutes at a temperature of 120° C.

A burning test of the curtain obtained was carried out by the aforementioned method for testing non-inflammability of curtains. The carbonized length was 4.9 cm., after-flame time and after-smoke time were both 0 sec. and the curtain qualified as 1st class. On the other hand, a curtain which had not been treated with the above flame retarding agent was burnt completely.

EXAMPLE 12

Acrylonitrile polymer fibers were obtained from an acrylonitrile copolymer containing 87% acrylonitrile, 5% vinyl acetate and 8% vinyl bromide and having a specific viscosity of 0.16 in the same method as in Example 1 using a stable aqueous solution containing 8% of the flame retarding agents indicated below.

$$(RO)_2-\overset{O}{\underset{\|}{P}}-O-\underset{\underset{O}{\|}}{C}-NH_2$$

(1) R is CH$_3$
(2) R is C$_2$H$_5$
(3) R is C$_3$H$_6$Br
(4) R is CH$_2$CHBrCH$_2$Br

Casement curtains obtained from the fibers by a conventional method and having a weight of 220 g./m.$^2$ were tested by the aforementioned method for non-inflammability (with flame contact time 2 minutes), and the following results were obtained.

| | Carbonized length (cm.) | After-flame time (sec.) | After-smoke time (sec.) | Qualification (class) |
|---|---|---|---|---|
| Untreated | >15 | (¹) | (¹) | <3 |
| (1) | 6.1 | 0 | 0 | 2 |
| (2) | 6.0 | 0 | 0 | 2 |
| (3) | 7.3 | 0 | 0 | 2 |
| (4) | 5.8 | 0 | 0 | 2 |

¹ Completely burnt.

EXAMPLE 13

Acrylonitrile polymer fibers were obtained from a copolymer containing 93% acrylonitrile and 7% vinyl acetate and having a specific viscosity of 0.16 by the same method as in Example 1 except that emulsions containing 15% of the 4 kinds of flame retarding agents in Example 12 were used.

A model bedding quilt made by using these fibers was tested by the aforementioned method for non-inflammability of bedding quilt, and the bedding quilt was found to be self-extinguishing about 2.5 sec. after the alcohol had burnt. On the other hand, a bedding quilt made by using fibers which did not contain flame retarding agent continued to burn and burnt completely.

EXAMPLE 14

A copolymer with a specific viscosity of 0.155 containing 93% acrylonitrile and 7% methyl acrylate was dissolved in a dimethylformamide containing 3.5% on the basis of the polymer of the flame retarding agents indicated below, and spinning solutions containing 27% polymer were obtained.

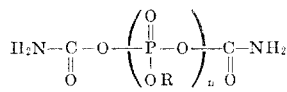

(1) R is $CH_3$ and $n$ is about 8.
(2) R is $C_2H_5$, and $n$ is about 8.

Acrylonitrile filaments were obtained from this spinning solution by the same method as in Example 6 and the filaments were cut into staple fibers.

A tufted carpet obtained from these fibers in the same manner as in Example 6 was tested and the following results were obtained.

| | Meckel Burner Method | | | | |
|---|---|---|---|---|---|
| | Carbonized length (cm.) | After-flame time (sec.) | After-smoke time (sec.) | Qualification (class) | Paper match method |
| (1) | 9.4 | 0 | 0 | 2 | No inflammation. |
| (2) | 9.2 | 0 | 0 | 2 | Do. |

EXAMPLE 15

A polyester/rayon (65/35) mixed-spun, plain woven fabric with a weight of 158 g./m.$^2$ was immersed in an aqueous solution containing a flame retarding agent of the following compound, squeezed out to a squeezing ratio of 100% by a mangle, then dried for 30 minutes at a temperature of 130° C. in an oven.

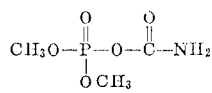

The flame retardant fabric obtained by this example and a fabric which had been treated in a similar method except for using $O=P(OCH_2CHBrCH_2Br)_3$ (TBPP) were tested by the Meckel Burner Method and the results are shown below.

| Adhering quantity (percent o.w.f.) | Flame retarding agent of this example— | TBPP |
|---|---|---|
| 5 | Burnt completely. | Burnt completely. |
| 10 | Self-extinguishing. | Do. |
| 15 | do | Do. |
| 20 | do | Do. |

Furthermore, 30 g. each of the compound used in this example and TBPP were taken into test tubes and heated for 30 minutes at a temperature of 200° C.

The compound used in this example did not indicate any coloration and remained transparent, whereas TBPP became black.

EXAMPLE 16

Pile carpet composed of fibers of polyethylene terephthalate and having a pile yarn weight of 1,300 g./m.$^2$ and pile height of 7 mm. was sprayed with a methanol solution containing the following flame retarding agent. The adhering quantity of flame retarding agent was 17 g./m.$^2$. Next, the treated carpet was dried at 100° C.

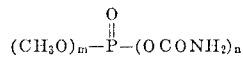

(total of $m$ and $n$ is about 3.)

The carpet obtained was not inflamed by the Paper Match Method.

EXAMPLE 17

Pile carpet made from nylon 6 fibers and having a pile yarn weight of 1,200 g./m.$^2$ and pile height of 7 mm. was sprayed with a methanol solution containing a flame retarding agent by the same method as used in Example 6. The adhering quantity of the flame retarding agent was 15 g./m.$^2$. Next, thet reated carpet was dried at 120° C.

The carpet obtained was not inflamed by the Paper Match Method.

EXAMPLE 18

A curtain material of acetate rayon was immersed in an aqueous solution containing 20% of the same flame retarding agent used in Example 16, squeezed so that the squeezing ratio was 80%, predried for 10 minutes at a temperature of 80° C. and heat treated for 2 minutes at a temperature of 120° C.

The curtain obtained was subjected to a burning test according to the aforementioned method for non-inflammability. By the test, the carbonized length was 7 cm., after-flame time and after-smoke time were both 0 sec. and the curtain qualified as 2nd class.

Also, there was no difference in the moisture absorbance and hand feel of the fibers when compared with untreated fibers.

EXAMPLE 19

(A) 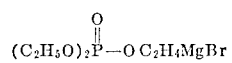

was obtained by a conventional method from

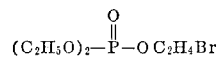

which was obtained by the same method as in Example 3. Separately,

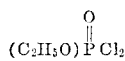

was condensed from ethyl alcohol and phosphorus oxychloride and added to the above Grignard's reagent in an ether solution. After heating, the precipitate was separated by filtering, and the ether was removed from the filtrate by distillation under reduced pressure. The resulting compound was added in small increments to 1 liter of water and heated at 45° C. until hydrolysis was completed. Hydrochloric acid and water were distilled off from the product under reduced pressure. Urea was added thereto in a nitrogen stream and heated for 90 minutes at a temperature 160 to 170° C. to obtain the following product.

(B) 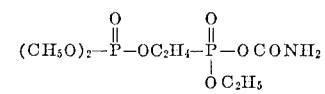

(B) Acrylonitrile polymer fibers containing the above flame retarding agent were obtained by the same method as that of Example 2. A carpet made from this fiber was not inflamed by the Paper Match Method and by the Meckel Burner Method, the carbonized length was 9.4 cm., the after-flame time was 0 sec., after-smoke time was 0 sec. and the carpet qualified as 2nd class.

While the invention has been described in conjunction with certain embodiments thereof, it is to be understood

What is claimed is:

1. Flame retardant fiber selected from the group consisting of natural and synthetic fibers containing a compound having the general formula

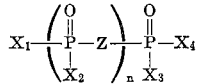

wherein $X_1$, $X_2$, $X_3$ and $X_4$ are selected from the group consisting of OH, $ONH_4$, $OCONH_2$, $OCONHCH_2OH$ and $OR_1$; $R_1$ is selected from the group consisting of hydrocarbons containing from 1 to 18 carbon atoms and said hydrocarbons containing substituents selected from the group consisting of halogen and hydroxyl; at least one member among $X_1$, $X_2$, $X_3$ and $X_4$ is $OR_1$ and at least one member among $X_1$, $X_2$, $X_3$ and $X_4$ is selected from the group consisting of $OCONH_2$ and $OCONHCH_2OH$;

Z is selected from the group consisting of O, $OR_2$ and $OR_2$–O; $R_2$ is alkylene and $n$ is an integer from 0 to 20.

2. Flame retardant fiber of claim 1 wherein said compound has the general formula

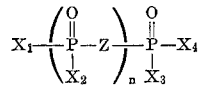

wherein $X_1$, $X_2$, $X_3$, $X_4$ and Z are the same as in claim 1 and $n$ is an integer from 1 to 20.

3. Flame-retardant fiber of claim 1 wherein said compound has a structural formula selected from the group consisting of

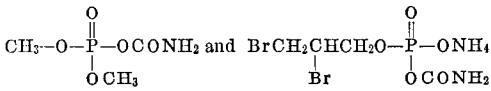

4. Flame-retardant fiber of claim 1 wherein said fiber is composed of acrylonitrile polymer.

5. Flame-retardant fiber of claim 1 wherein said fiber is composed of fiber forming material selected from the group consisting of cellulose acetate, polyamide and polyester.

References Cited

UNITED STATES PATENTS

| 3,188,341 | 6/1965 | Smith et al. | 260—928 |
| 3,247,198 | 4/1966 | Cheymol et al. | 260—933 |
| 3,345,432 | 10/1967 | Gillham et al. | 260—45.9 |

FOREIGN PATENTS

| 1,372,445 | 8/1964 | France | 260—933 |

DONALD E. CZAJA, Primary Examiner

R. W. GRIFFIN, Assistant Examiner

U.S. Cl. X.R.

8—116.2, DIG.4, DIG.21; 106—15FP, 177; 117—136; 260—45.7, DIG.24